(12) United States Patent
Porrill et al.

(10) Patent No.: US 11,753,774 B2
(45) Date of Patent: Sep. 12, 2023

(54) ANCHORING DEVICE FOR A RAILWAY RAIL FASTENING ASSEMBLY

(71) Applicant: Pandrol Limited, Addlestone (GB)

(72) Inventors: John Phillip Porrill, Godalming (GB); John David Spencer, Effingham (GB); Stephen John Cox, Richmond (GB); Brenton Keast, Largs Bay (AU); Steven Harkness, North Plympton (SA); Chris Lea, Walkley Heights (AU)

(73) Assignee: Pandrol Limited, Addlestone (GB)

( * ) Notice: Subject to any disclaimer, the term of this patent is extended or adjusted under 35 U.S.C. 154(b) by 515 days.

(21) Appl. No.: 17/046,357

(22) PCT Filed: Feb. 28, 2019

(86) PCT No.: PCT/EP2019/054940
§ 371 (c)(1),
(2) Date: Oct. 9, 2020

(87) PCT Pub. No.: WO2019/197075
PCT Pub. Date: Oct. 17, 2019

(65) Prior Publication Data
US 2021/0148057 A1    May 20, 2021

(30) Foreign Application Priority Data

Apr. 11, 2018   (GB) ..................... 1805999

(51) Int. Cl.
*E01B 9/48*  (2006.01)
*E01B 9/30*  (2006.01)
(Continued)

(52) U.S. Cl.
CPC .............. *E01B 9/483* (2013.01); *B23P 15/20* (2013.01); *E01B 9/30* (2013.01); *E01B 9/303* (2013.01);
(Continued)

(58) Field of Classification Search
CPC ...... E01B 9/303; E01B 9/483; E01B 2201/00; E01B 9/00; E01B 9/28; E01B 9/30;
(Continued)

(56) References Cited

U.S. PATENT DOCUMENTS

| 5,735,458 A * | 4/1998 | Brown .................... E01B 9/303 238/349 |
| 6,761,322 B1 * | 7/2004 | Porrill .................... E01B 9/483 238/264 |

(Continued)

FOREIGN PATENT DOCUMENTS

| EP | 0826826 A1 | 3/1998 | |
| GB | 2435285 A * | 8/2007 | ......... B28B 23/0056 |

(Continued)

OTHER PUBLICATIONS

ISRWO of corresponding PCT/EP2019/054940 dated May 28, 2019.
UK search report of corresponding GB1805999.8 dated Oct. 1, 2018.

*Primary Examiner* — Zachary L Kuhfuss
*Assistant Examiner* — Cheng Lin
(74) *Attorney, Agent, or Firm* — Vorys, Sater, Seymour and Pease LLP

(57) ABSTRACT

An anchoring device for use in retaining a railway rail fastening clip having first and second leg portions and a rail-bearing portion therebetween. The anchoring device includes a base member, an opening in the base member configured to receive a fastening component for fastening the anchoring device to an underlying foundation, and first and second clip-retaining sides extending from said base member with the first clip-retaining side being spaced apart from the second clip-retaining side so as to define a space therebetween for receiving the rail-bearing portion of the clip. Each clip-retaining side comprising upper and lower (Continued)

clip contact walls defining a passageway for receiving one of the leg portions, wherein the leg portions contact the clip contact walls of the respective clip-retaining sides as the clip moves from a wedged position towards an engaged position where the rail-bearing portion of the clip bears on the rail.

20 Claims, 9 Drawing Sheets

(51) Int. Cl.
 *E01B 13/02* (2006.01)
 *B23P 15/20* (2006.01)
 *E01B 9/34* (2006.01)
(52) U.S. Cl.
 CPC .................. *E01B 9/34* (2013.01); *E01B 9/48* (2013.01); *E01B 13/02* (2013.01)
(58) Field of Classification Search
 CPC ..... E01B 9/32; E01B 9/34; E01B 9/44; E01B 9/46; E01B 9/48; E01B 9/60; E01B 9/62; E01B 13/00; E01B 13/02; E01B 2205/00; E01B 2201/02
 See application file for complete search history.

(56) References Cited

U.S. PATENT DOCUMENTS

| 8,286,891 | B2 * | 10/2012 | Cox | ........................ E01B 9/303 238/349 |
| 2012/0318881 | A1 * | 12/2012 | Cox | .......................... E01B 9/36 238/338 |

FOREIGN PATENT DOCUMENTS

| GB | 2435285 A | 8/2007 | | |
| WO | 9312296 | 6/1993 | | |
| WO | WO-9312296 A1 * | 6/1993 | ............... | E01B 9/30 |
| WO | 2014118512 A1 | 8/2014 | | |
| WO | WO-2014118512 A1 * | 8/2014 | ............... | E01B 9/28 |

* cited by examiner

ANCHORING DEVICE FOR A RAILWAY RAIL FASTENING ASSEMBLY

BACKGROUND

In the documents WO93/12294, WO93/12295 and WO93/12296, the present applicants disclosed a railway rail fastening system in which a rail fastening clip is driven laterally onto the rail and can be held in a clip anchoring device (shoulder) in a "pre-assembly" or "parked" position in which the toe portion of the clip does not bear on the rail. This enables railway sleepers to be preloaded at the factory with clips which are held captive in the pre-assembly position such that when the sleepers are delivered to site the clips can simply be driven home once the rail is in place. In addition, when maintenance of the rail is subsequently required, the clip can be driven off the rail back into the pre-assembly position, so complete withdrawal of the clip from the shoulder is not necessary. Such clips are sometimes known as "switch-on/switch-off" clips.

Anchoring devices for retaining switch-on/switch-off clips are typically made by casting. Features on the casting cooperate with mating features on the clip to retain the clip positively at each of the positions described above. The process by which cast iron shoulders are manufactured is usually highly automated, but is really just a mechanized version of the following simple manual process. A pattern is first manufactured, which is basically a re-useable model of the finished part. The pattern is pressed into a box that is made up of two halves, each of which is filled to the brim with moulding sand. The two halves are separated and the pattern is removed, so that a mirror image impression is left in the sand, half of which is in one box and the other in the other box. The two halves of the box are then joined back together, and molten cast iron is poured into the void. When it has set, the box is split again, and the finished part is removed. The sand is then taken out of the box, cleaned, and repacked in for the next moulding cycle. On the finished part, a flash line is typically left around the joint (the split line) between the two halves of the box, and a sprue where the molten metal was fed in. If these are in critical areas on the finished part, they have to be dressed off (fettled).

In some castings, the shape of the part may dictate that, rather than having a simple planar split between the two halves of the box, the joint will need to be stepped. Although quite possible, this more complex joint line is a disadvantage in production.

In document WO2014/118512, the present applicant disclosed a railway rail fastening assembly 10 comprising an anchoring device 12 as shown in FIGS. 1a and 1b of the present application. The anchoring device 12 comprises a protrusion 28 on a bottom surface 30 to allow for vertical adjustment relative to an underlying foundation 18. The anchoring device 12 comprises an opening 32 for receiving a fastener to fasten the anchoring device 12 to the underlying foundation 18. The anchoring device 12 also comprises upper clip contact walls 35a, 35b and lower clip contact walls 36a, 36b, which together form a passage on either side of the anchoring device 12 to guide leg portions 14a of a clip 14. However, such an anchoring device is difficult to cast due to the complexity of its features. In particular, a pattern of the anchoring device 12 cannot be removed from a casting mould without the walls of the void at least partially caving in. As a result, the anchoring device 12 requires significant machining after casting, thereby adding to the cost of manufacture.

SUMMARY OF THE DISCLOSURE

According to an aspect of the present disclosure there is provided an anchoring device for use in retaining a railway rail fastening clip having first and second leg portions and a rail-bearing portion therebetween, the anchoring device comprising:

a base member;

an opening in the base member configured to receive a fastening component for fastening the anchoring device to an underlying foundation; and first and second clip-retaining sides extending from said base member with the first clip-retaining side being spaced apart from the second clip-retaining side so as to define a space between the first and second clip-retaining sides for receiving the rail-bearing portion of the clip;

wherein each of the first and second clip-retaining sides comprises upper and lower clip contact walls defining a passageway for receiving one of the first and second leg portions of the clip, wherein each of the first and second leg portions of the clip contact the upper and lower clip contact walls of the respective first and second clip-retaining sides as the clip moves in a first direction from an initial wedged position towards an engaged position in which the rail-bearing portion of the clip bears on the rail, and wherein the upper and lower clip contact walls are spaced apart in the first direction so as not to overlap one another.

Advantageously, the anchoring device of the present disclosure may be cast without requiring inserts. Contrary to conventional wisdom, it has been realised that it is possible to have upper and lower clip contact walls that do not overlap. It was previously thought that relatively long contact walls were required due to the rate at which energy is stored in the clip as it travels through the passageway defined by the upper and lower clip contact walls. However, it has been discovered that this is not the case and that shorter contact walls are possible.

The clip may be placed in the initial wedged position by hand. A tool may then be used to move the clip into an intermediate parked position in which the clip is held captive prior to installation on the railway rail. The or another tool may then drive the clip into the engaged position when being installed on a railway rail.

The base member may have a top surface and a bottom surface. The bottom surface may be configured to face an underlying foundation when the anchoring device is installed. The upper and lower clip contact walls may not overlap one another in a direction substantially perpendicular to the bottom surface of the base member. In other words, the upper contact wall may not overhang the lower clip contact wall, e.g. when the anchoring device bottom surface is substantially horizontal. The anchoring device may advantageously be moulded from top to bottom, e.g. with a split line substantially parallel to the bottom surface of the base member. The split line may deviate to follow the upper contact walls.

The lower clip contact walls may each define an upper surface that is continuous with the top surface of the base member.

The first and second clip-retaining sides may be configured such that an initial upper contact point on the upper clip contact wall, at which the clip first contacts the upper contact wall in the initial wedged position, may be forward in the first direction of an engaged contact point on the lower clip contact wall, at which the clip contacts the lower clip contact wall in the engaged position.

The lower clip contact walls may each comprise a ramp defining an initial lower clip contact point on the lower clip contact wall, at which the clip first contacts the lower clip contact wall in the initial wedged position. The ramp may be provided at an end of the lower clip contact wall furthest from the upper clip contact wall. The initial lower clip contact point may be at an end of the ramp, e.g. at the end closest to the upper clip contact wall.

The ramp may comprise a substantially flat portion. Each ramp may be formed by a respective notch in an end of the lower clip contact wall. The notches may be laterally spaced apart across a width of the anchoring device.

The anchoring device may further comprise a downwards facing protrusion provided on a bottom surface of the base member. The anchoring device protrusion may be configured to slidably engage with a corresponding recess associated with the underlying foundation so as to permit vertical adjustment of the anchoring device relative to the underlying foundation. The ramps may be provided above the downwards facing protrusion. This arrangement may allow the reduction of material caused by the notches at this location.

An end of the lower clip contact wall that is closest to the upper clip contact wall may have an end surface that is angled relative to the bottom surface of the base member with a non-perpendicular angle, e.g. such that the end of the lower clip contact wall is undercut. An end of the upper clip contact wall that is closest to the lower clip contact wall may have an end surface that is angled relative to the bottom surface of the base member with a non-perpendicular angle. The end surface of the lower clip contact wall and the end surface of the upper clip contact wall may be substantially in line, e.g. with the end surfaces having the same angle relative to the base member bottom surface.

The upper clip contact wall may be tapered at an end closest to the lower clip contact wall, e.g. such that the upper clip contact wall may define a first lower surface that may be angled relative to the bottom surface of the base member with a first angle. The first angle of the first lower surface may substantially correspond to an angle of a chamfer at an end of the first and second leg portions of the clip when the clip is in the initial wedged position.

A mid-region of the upper clip contact wall may be tapered, e.g. such that the upper clip contact wall may define a second lower surface that may be angled relative to the bottom surface of the base member with a second angle. The first angle may be greater than the second angle.

The anchoring device may be configured such that the clip may move substantially linearly between the initial wedged position and the engaged position.

The opening in the base member may be enclosed, e.g. the opening may be circular. The opening may be configured to receive a stud, e.g. which extends into the underlying foundation. By contrast, the opening in the base member may not be enclosed. The opening may be configured to receive a clamp. The clamp may be configured to clamp the anchoring device to the underlying foundation.

The anchoring device may be in the form of a shoulder that sits to one side of the railway rail. A pair of such shoulders may be provided either side of the rail. Alternatively, the anchoring device may be in the form of a base plate that extends beneath the rail with first and second clip retaining sides on each side of the rail. Accordingly, the anchoring device may comprise a first set of first and second clip retaining sides on a first end of the base member and a second set of first and second clip retaining sides on a second end of the base member. A space for receiving the railway rail may be defined between the first and second sets of the first and second clip retaining sides.

Each of the first and second clip retaining sides may comprise a side wall extending between the upper and lower clip contact walls. The side walls of the first and second clip retaining sides may be laterally inboard of respective first and second leg portions of the clip when the clip is installed. Alternatively, the side walls of the first and second clip retaining sides may be laterally outboard of respective first and second leg portions of the clip when the clip is installed.

The anchoring device may further comprise at least one catch feature configured to hold the clip captive when the clip is in an intermediate parked position between the initial wedged position and the engaged position, e.g. to prevent the clip retreating to the initial wedged position.

The catch feature may comprise an abutment surface that engages a corresponding abutment surface associated with the clip. Engagement of the abutment surfaces may resist movement of the clip away from the intermediate parked position. The abutment surface associated with the clip may be provided on a toe insulator for the clip.

The catch feature may be centrally disposed between the first and second clip retaining sides. Alternatively, a pair of catch features may be provided between the first and second clip retaining sides. In this case the catch features may be spaced apart. This may permit access to a fastener for fastening the anchoring device to the underlying foundation. Each of the first and second clip-retaining sides may have a catch feature associated therewith. The catch features may be connected to, or form part of, respective first and second clip-retaining sides.

A railway fastening assembly may comprise the above-mentioned anchoring device. The assembly may comprise the railway rail fastening clip. The railway rail fastening clip may be M-shaped, e.g. when viewed from above and when installed.

The assembly may comprise a side post insulator, e.g. providable between the anchoring device and the railway rail. The railway rail fastening clip, e.g. the rail-bearing portion, may overhang the side post insulator when in the initial wedged position. The clip may also overhang the sidepost insulator when in the intermediate parked position. The assembly may comprise a toe insulator provided on the rail-bearing portion of the railway rail fastening clip. The toe insulator and/or railway rail fastening clip may overhang the side post insulator when in the initial wedged position.

BRIEF DESCRIPTION OF THE DRAWINGS

Reference will now be made to the accompanying drawings in which:

FIGS. 5a, 5b and 5c (collectively FIG. 5) are side views in which the anchoring device according to the first arrangement of the present disclosure and associated clip are depicted in solid lines and the previously-proposed anchoring device and associated clip are depicted in dashed lines, wherein FIGS. 5a, 5b and 5c show the rail fastening clip in the initial wedged position, the intermediate parked position, and the engaged position respectively;

DETAILED DESCRIPTION

Figure 1A:
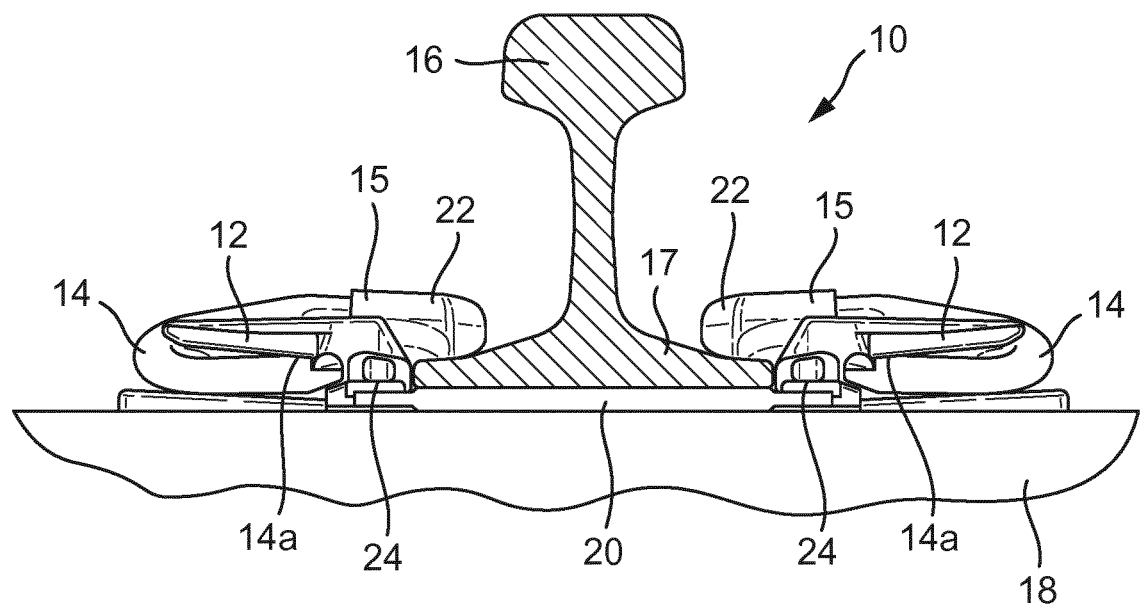
FIG. 1a is a side view of a previously-proposed rail fastening assembly comprising an anchoring device.
Figure 1B:
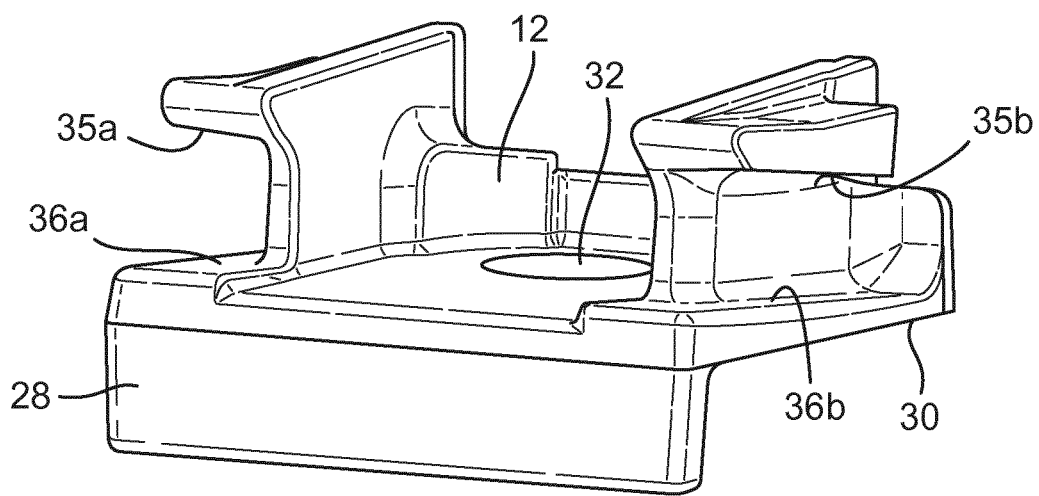
FIG. 1b is a perspective view of the anchoring device from the previously-proposed rail fastening assembly.
Figure 2A:
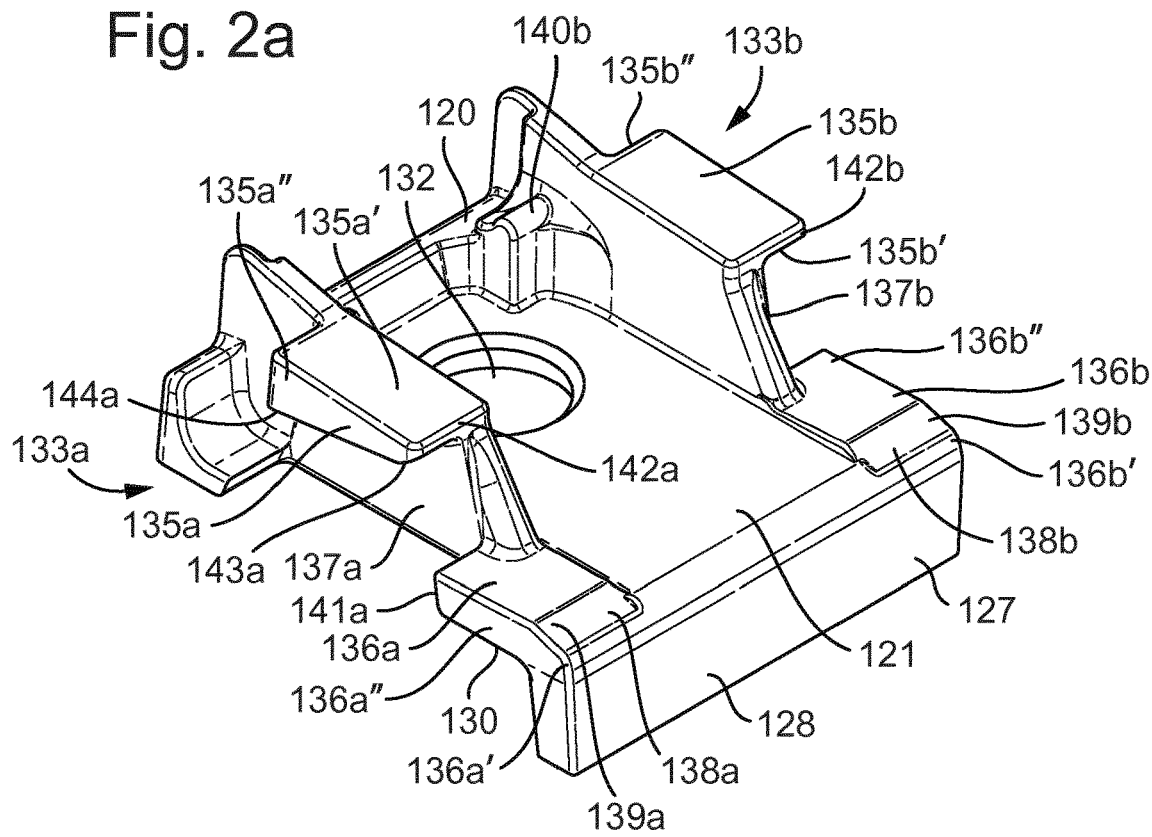
FIGS. 2a and 2b (collectively FIG. 2) are perspective views of an anchoring device according to a first arrangement of the present disclosure.
Figure 2B:
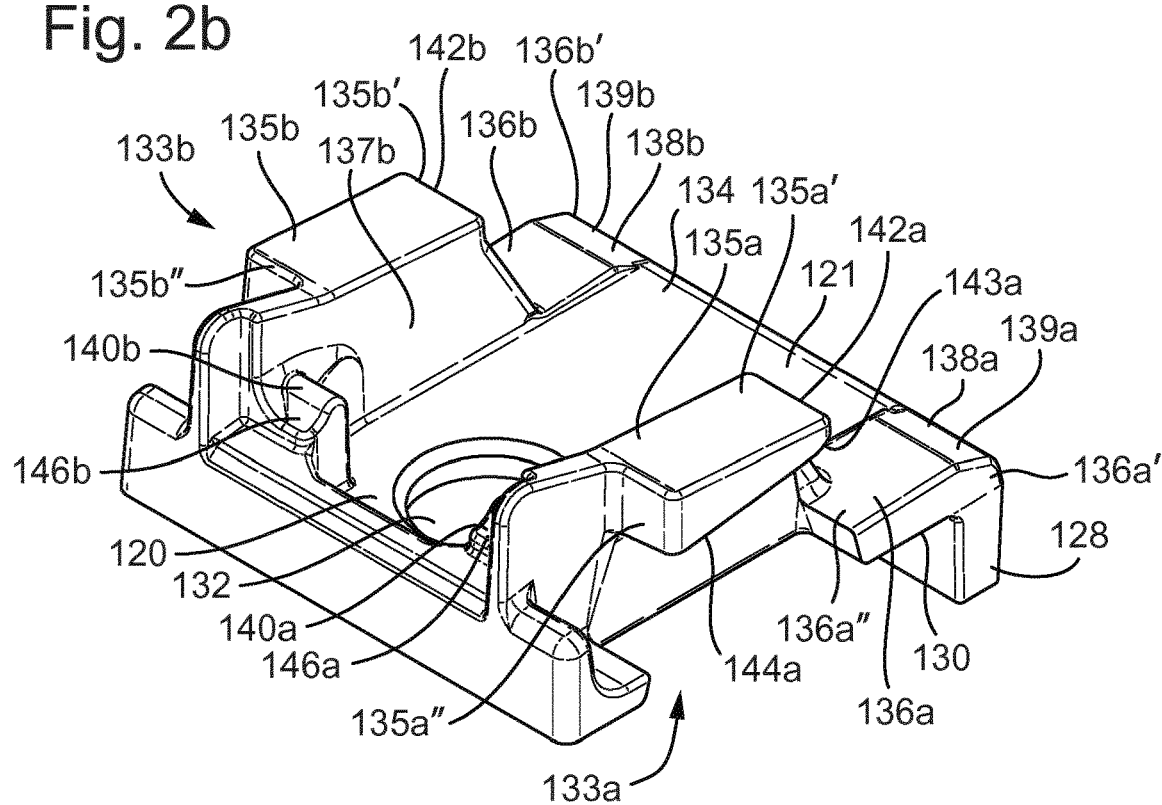

With reference to FIG. 2, an anchoring device 120, e.g. a shoulder, according to a first arrangement of the present disclosure may form part of a railway rail fastening assembly 10 as depicted in FIG. 1a. In other words, the anchoring device 120 may replace the anchoring device 12 depicted in FIG. 1a. As such, the anchoring device 120 is configured to receive a railway rail fastening clip 14 and may be connected to an underlying foundation 18, such as a railway sleeper or slab. Respective anchoring devices 120 are provided on either side of a railway rail 16 for retaining clips 14 which bear on a rail foot 17. The clip 14 secures the railway rail 16 to the underlying foundation by virtue of forces exerted by the clip on the anchoring device 12 and the rail 16.

The clip 14 has first and second leg portions 14a and a rail-bearing "toe" portion 15 therebetween. The clip 14 may be M-shaped, e.g. when viewed from above and when installed. The clip 14 may be configured such that it can be deflected from a non-operative configuration to at least one operative configuration in which the toe portion 15 of the clip bears on the rail. The clip 14 may be resilient and may be made from a rod of resilient material. The clip 14, as shown in FIG. 1a, may be of the type that is inserted into engagement with the anchoring device 120 and rail 16 in a substantially lateral direction relative to a longitudinal axis of the rail. By way of example, the clip 14 may be a Pandrol Fastclip®.

The railway rail fastening assembly 10 may further comprise a railway rail pad 20. The pad 20 may comprise a plate of resilient material for providing cushioning between the rail foot 17 and the underlying foundation 18.

The railway rail fastening assembly 10 may further comprise one or more electrically insulating wear pieces, such as a toe insulator 22 and a side post insulator 24. The toe insulator 22 may be carried by the toe portion 15 of the clip 14 and may bear against the rail foot 17 in an installed configuration. The toe insulator 22 may electrically insulate the rail from the clip and/or limit wear between the rail and the clip. The side post insulator 24 may be positioned between the anchoring device 120 and the rail foot 17 in an installed configuration and the side post insulator 24 may extend along the width of the anchoring device. The side post insulator 24 may electrically insulate the rail from the anchoring device and/or limit wear between the rail and the anchoring device.

The railway rail fastening assembly 10 may further comprise one or more fastening means 26, such as a bolt (depicted in FIG. 4). The fastening means 26 may be configured to fasten the anchoring device 120 to the underlying foundation 18.

Referring to FIG. 2, the anchoring device 120 comprises a base member 121. The base member 121 may have a bottom surface 130 and a top surface 134. The bottom surface 130 may be configured to face the underlying foundation 18 when the anchoring device 120 is installed. The top surface 134 may be configured to receive the clip 14, as will be described in more detail below.

The anchoring device 120 may comprise a protrusion 128 provided on the bottom surface 130 of the base member, e.g. facing the underlying foundation 18 when in the installed configuration. The anchoring device protrusion 128 is configured to cooperate with a corresponding recess provided in a receiving portion associated with the underlying foundation. The cooperation of the anchoring device protrusion 128 with the receiving portion recess permits a substantially vertical adjustment of the anchoring device 120 relative to the underlying foundation 18.

It will be appreciated that the rail 16 may be angled with respect to the vertical, e.g. due to opposing rails being angled towards one another and/or due to a cant angle. As a result, references to a substantially vertical adjustment of the anchoring device may also comprise a component of lateral adjustment, e.g. the adjustment may be in a direction substantially parallel to a midline of the respective rail. Alternatively, the adjustment may be in a vertical direction whether the rail is angled or not. In any event, references to a vertical adjustment of the anchoring device may simply mean that the anchoring device has been adjusted to a higher or lower position.

As shown in FIG. 2, the anchoring device 120 further comprises an opening 132 that extends through the base member 121 from the top surface 134 to the bottom surface 130. The opening 132 is configured to cooperate with the fastening means 26. The fastening means 26 passes through opening 132 when in the installed configuration. For example, a stud or bolt shaft may pass through the opening 132. The opening 132 may be sized such that a head of the bolt, nut, or intermediate washer, abuts the top surface 134 of the anchoring device. As mentioned above, the fastening means 26 is configured to fasten the anchoring device 120 to the underlying foundation 18.

The protrusion 128 may be provided in a region of the anchoring device 120 away from the railway rail 16 when in the installed configuration. In particular, the protrusion 128 may be provided at an end of the anchoring device 120 furthest from the railway rail 16. For example, the protrusion 128 may, at least in part, form a rear face 127 of the anchoring device. By contrast, the opening 132 may be provided in a region of the anchoring device adjacent to the rail 16 when in the installed configuration. The protrusion 128 may be spaced apart from the opening 132, e.g. an edge of the opening.

As shown in FIG. 2, the protrusion 128 may extend across the width, e.g. the entire width, of the anchoring device 120. The protrusion 128 may be substantially elongate and the protrusion 128 may extend in a direction substantially parallel to the longitudinal axis of the rail 16. The protrusion 128 cross-section (in a substantially horizontal plane when installed) may however be any other shape, such as square, rectangular, or any other shape. The protrusion 128 may be integral with the anchoring device. Apart from the protrusion 128, the bottom surface 130 of the base member 121 may be substantially flat.

As is also depicted in FIG. 2, the anchoring device 120 comprises first and second clip-retaining sides 133a, 133b on either side of the base member 121. The first clip-retaining side 133a is spaced apart from the second clip-retaining side 133b so as to define a space for receiving the toe portion 15 of the clip 14. The first and second clip-retaining sides 133a, 133b each comprise upper clip contact walls 135a, 135b and lower clip contact walls 136a, 136b, which together form a passage on either side of the anchoring device 120 to guide leg portions 14a of the clip 14.

The lower clip contact walls 136a, 136b may form part of the base member 121. Accordingly, the lower clip contact walls 136a, 136b may each define an upper surface that is continuous with the top surface 134. The upper clip contact walls 135a, 135b are provided on respective first and second side walls 137a, 137b, which extend from the top surface 134 of the base member 121. The first and second side walls 137a, 137b are provided either side of the opening 132 and laterally inboard of the clip leg portions 14a when the clip is installed.

Referring still to FIG. 2, the anchoring device 120 may further comprise first and second catch features 140a, 140b, which may help hold the clip 14 in an intermediate parked position prior to engagement with the rail 16. The first and second catch features 140a, 140b may be connected to, or form part of, respective first and second clip-retaining sides 133a, 133b. In particular, the first and second catch features 140a, 140b may be provided at an inboard position on the respective first and second clip-retaining sides 133a, 133b. The first and second catch features 140a, 140b may each comprise an abutment surface 146a, 146b that faces the rail 16 and that engages a corresponding abutment surface associated with the clip 14. Engagement of the corresponding abutment surfaces may resist movement of the clip 14 in a direction away from the rail. Furthermore, the first and second catch features 140a, 140b may comprise a curved profile to help the clip 14 ride over the catch feature as the clip moves into the intermediate parked position. Although a pair of spaced apart catch features is shown, it is also envisaged that other numbers of catch features may be provided, e.g. a single catch feature.

Figure 3A:
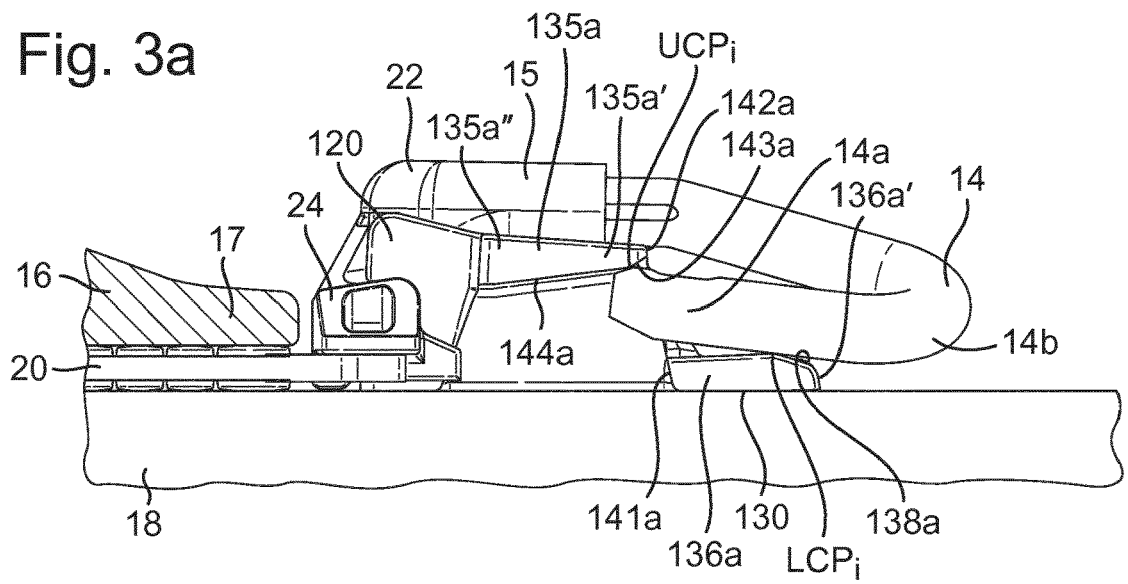
FIGS. 3a, 3b and 3c (collectively FIG. 3) are side views of the anchoring device according to the first arrangement of the present disclosure with FIGS. 3a, 3b and 3c showing a rail fastening clip in an initial wedged position; an intermediate parked position; and an engaged position respectively.
Figure 3B:
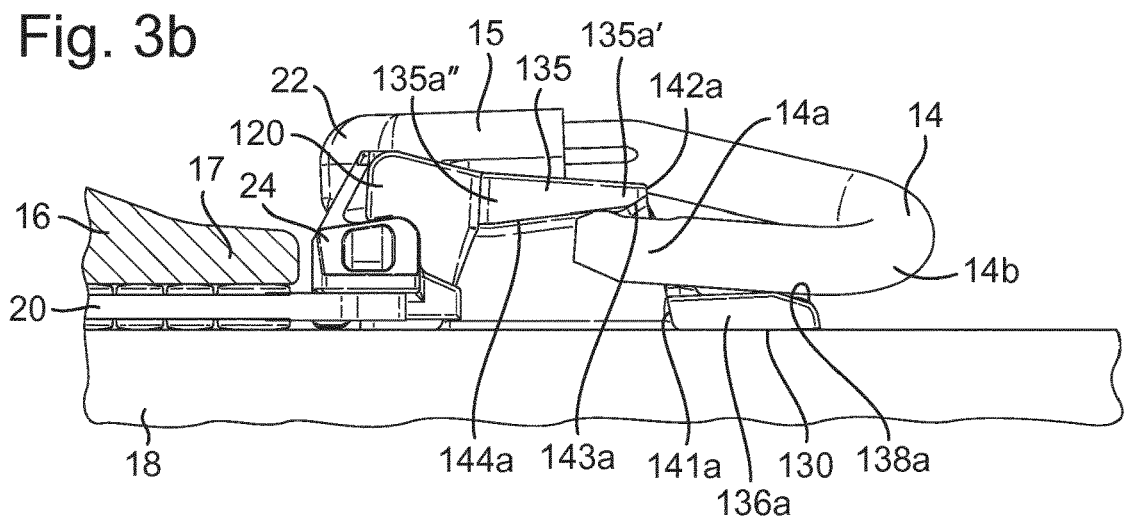
Figure 3C:
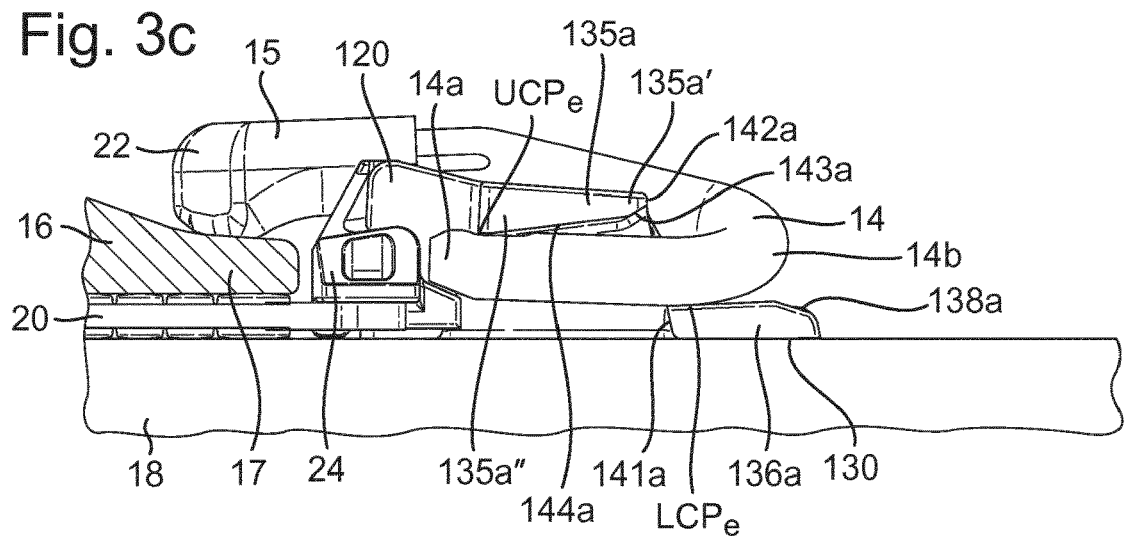
Figure 4A:
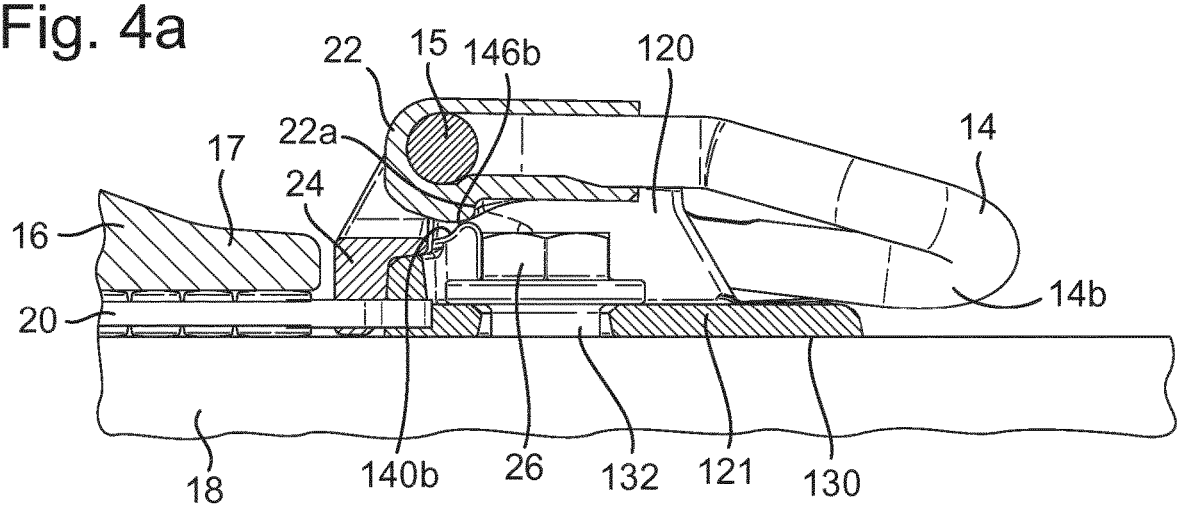
FIGS. 4a, 4b and 4c (collectively FIG. 4) are sectional views of the anchoring device according to the first arrangement of the present disclosure with FIGS. 4a, 4b and 4c showing the rail fastening clip in the initial wedged position; the intermediate parked position; and the engaged position respectively.
Figure 4B:
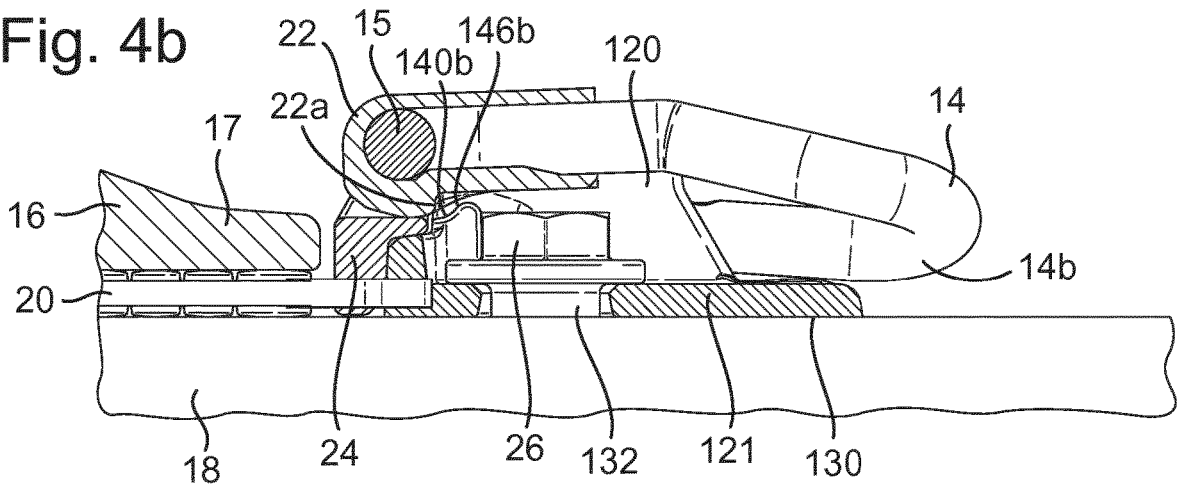
Figure 4C:
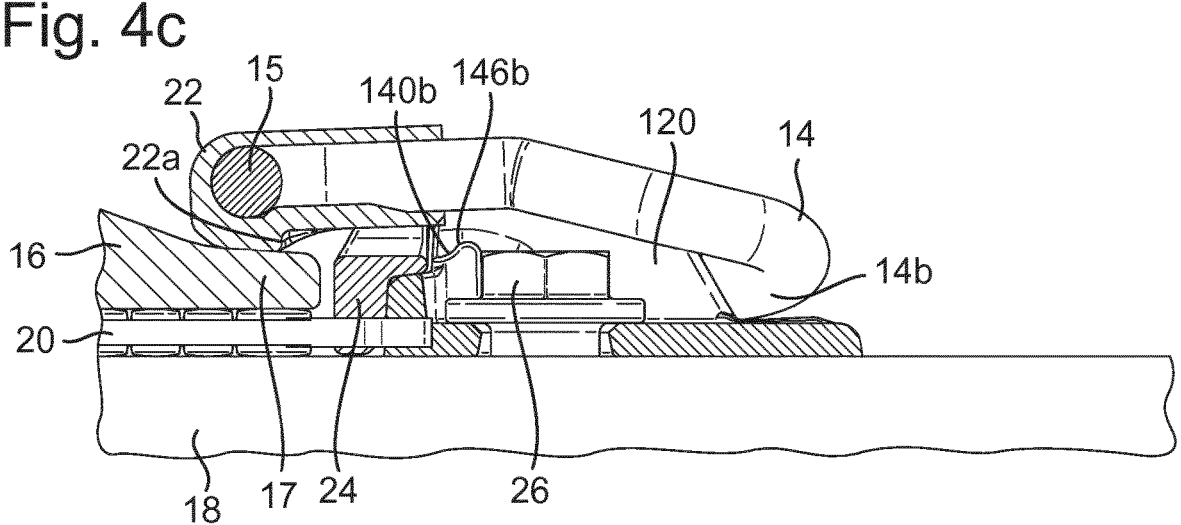

FIGS. 3 and 4 depict the progression of the clip 14 as it moves from an initial wedged position (FIGS. 3a and 4a), to a parked position (FIGS. 3b and 4b) and finally into a fully engaged position (FIGS. 3c and 4c). The clip 14 may be placed in the initial wedged position by hand. A tool may then be used to move the clip 14 into the intermediate parked position in which the clip is held captive prior to installation on the railway rail 16. The (or another) tool may then drive the clip 14 into the engaged position in which the toe portion 15 of the clip bears on the rail 16.

As depicted in FIGS. 3 and 4, each of the first and second leg portions 14a of the clip 14 contact the upper clip contact walls 135a, 135b and lower clip contact walls 136a, 136b of the respective first and second clip-retaining sides 133a, 133b as the clip 14 moves in a first direction (e.g. towards the rail 16) from the initial wedged position (as depicted in FIGS. 3a and 4a) towards the engaged position (as depicted in FIGS. 3c and 4c).

However, in contrast with the previously-proposed anchoring device 12, the upper clip contact walls 135a, 135b are spaced apart in the first direction from the lower clip contact walls 136a, 136b so as not to overlap one another. In other words, the upper clip contact walls 135a, 135b may not overhang the lower clip contact walls 136a, 136b, e.g. when the bottom surface 130 is substantially horizontal.

The point at which the clip 14 (in particular a proximal end of the leg portions 14a) contacts the lower clip contact walls 136a, 136b varies as the clip is driven from the initial wedged position to the engaged position. For example, the clip 14 may first contact the lower clip contact wall 136a, 136b in the initial wedged position at an initial lower clip contact point LCPi. When in the engaged position the clip 14 may then contact the lower clip contact wall 136a, 136b at an engaged lower clip contact point LCPe, which is closer to the rail 16 than the initial lower clip contact point LCPi.

Likewise, the point at which the clip 14 (in particular a distal end of the leg portions 14a) contacts the upper clip contact walls 135a, 135b varies as the clip is driven from the initial wedged position to the engaged position. For example, the clip 14 may first contact the upper clip contact wall 135a, 135b in the initial wedged position at an initial upper clip contact point UCPi. When in the engaged position the clip 14 may then contact the upper clip contact wall 135a, 135b at an engaged upper clip contact point UCPe, which is closer to the rail 16 than the initial upper clip contact point UCPi.

The initial upper clip contact point UCPi is closer to the rail end of the anchoring device 120 than the engaged lower clip contact point LCPe. Separating these contact points allows the upper clip contact walls 135a, 135b to be spaced apart from the lower clip contact walls 136a, 136b in the first direction.

The lower clip contact walls 136a, 136b may each comprise a ramp 138a, 138b at a first end 136a', 136b' of the lower clip contact walls furthest from the rail 16, i.e. at the start of the passage that guides the clip leg portions 14a. The initial lower clip contact point LCPi may be provided on or at an end of the ramps 138a, 138b. For example, the initial lower clip contact point LCPi may be provided at an end of the ramps 138a, 138b closest to the rail 16 when installed.

The ramps 138a, 138b may comprise a substantially flat portion 139a, 139b provided between the rear face 127 of the base member 121 and the top surface 134. The ramps 138a, 138b may be curved at ends of the flat portion 139a, 139b to transition from the rest of the lower clip contact walls 136a, 136b to the rear face 127.

The ramps 138a, 138b may be formed by a reduction in the thickness of the base member 121 in the region of the ramps. By way of example, each ramp 138a, 138b may be formed by a notch in an end of the lower clip contact walls 136a, 136b. The notches may be laterally spaced apart across a width of the anchoring device 120. Alternatively, the ramps 138a, 138b may be formed from a single ramp that extends across the full width of the anchoring device 120. Either way, the ramps 138a, 138b may be provided above the downwards facing protrusion 128. This arrangement may allow the reduction of material caused by the ramps 138a, 138b at this location.

The ramps 138a, 138b may lower a heel end 14b of the clip 14 in the initial wedged position. This may in turn enable the distal end of the clip leg portions 14a to contact the upper clip contact walls 135a, 135b, thereby allowing the clip to be driven into the anchoring device 120.

A second end 136a", 136b" of the lower clip contact walls 136a, 136b that is closest to the rail 16 may have an end surface 141a that is angled relative to the bottom surface 130 of the base member 121 with a non-perpendicular angle, e.g. such that the second end 136a", 136b" of the lower clip contact wall is undercut.

A first end 135a', 135b' of the upper clip contact walls 135a, 135b that is furthest from the rail 16 has an end surface 142a, 142b that is angled relative to the bottom surface 130 of the base member 121. The end surface 142a, 142b may be perpendicular or non-perpendicular relative to the bottom surface 130. In either case, the end surfaces 142a, 142b of the upper clip contact walls 135a, 135b may intersect with a line continuing from the end surfaces 141a of the lower clip contact walls 136a, 136b. In particular, the end surfaces 142a, 142b of the upper clip contact walls 135a, 135b may be in line with the end surfaces 141a of the lower clip contact walls 136a, 136b, e.g. with the end surfaces 141a, 142a, 142b having the same angle relative to the base member bottom surface 130.

In addition, the upper clip contact walls 135a, 135b may be tapered at the first end 135a', 135b' such that the upper clip contact walls define a first lower surface 143a that may be angled relative to the bottom surface 130 of the base member 121 with a first angle (relative to the base member bottom surface 130). As depicted in FIG. 3a, the first lower surface 143a may comprise the initial upper clip contact point UCPi, at which the clip 14 first contacts the upper clip contact walls 135a, 135b when in the initial wedged position. The angle of the first lower surface 143a may help deflect the clip leg portions 14a as the clip is driven towards the parked position (as depicted in FIG. 3b).

The distal end of the clip leg portions 14a may be chamfered and, as depicted in FIG. 3a, the first angle of the first lower surface 143a may substantially correspond to an angle of the chamfer (relative to the base member bottom surface 130) when the clip 14 is in the initial wedged position. Matching the angles of the clip chamfer and the first lower surface 143a may help reduce point loads on the upper clip contact walls 135a, 135b and may help drive the clip 14 towards the parked position.

Furthermore, a mid-region of the upper clip contact walls 135a, 135b may be tapered such that the upper clip contact walls define a second lower surface 144a that may be angled relative to the bottom surface 130 of the base member 121 with a second angle. The distal end of the clip leg portions 14a may travel along the second lower surface 144a as the clip is driven from the parked position (depicted in FIG. 3b) to the engaged position (depicted in FIG. 3c). The first angle of the first lower surface 143a may be greater than the second angle of the second lower surface 144a. Accordingly, the first lower surface 143a presents a steeper surface to the clip 14 than the second lower surface 144a.

FIG. 4 depicts the clip 14 riding over the second catch feature 140b as the clip moves from the initial wedged position (FIG. 4a) to the intermediate parked position (FIG. 4b). The curved profile of the second catch feature 140b may assist the clip 14 in riding over the second catch feature. Subsequently, an interaction between the abutment surface 146b of the second catch feature 140b and an abutment surface 22a associated with the clip 14 may restrict the clip 14 retreating away from the intermediate parked position and towards the initial wedged position. (The abutment surfaces do not appear to be touching in FIG. 4b at least partly because FIG. 4 is a sectional view taken through a midline of the anchoring device 120, whereas the abutment surfaces may engage in a different plane to that depicted.) Although not shown, similar interactions may occur in respect of the first catch feature 140a.

The abutment surface 22a associated with the clip 14 may be provided on the toe insulator 22 for the clip, in particular on an underside of the toe insulator 22. The abutment surface 22a may extend across a substantial portion of the width of the toe insulator 22 so that each of the first and second catch features 140a, 140b may engage the abutment surface 22a. Alternatively the abutment surface 22a may be divided into two distinct portions, one for each of the first and second catch features 140a, 140b.

The first and second catch features 140a, 140b may advantageously help to prevent the clip 14 from inadvertently moving away from the intermediate parked position. As the anchoring device 120 of the present disclosure has shorter upper clip contact walls 135a, 135b, the rate at which energy is stored in (or dissipated by) the clip is greater per unit distance of travel of the clip. There may therefore be a greater tendency for the clip to pop out of the intermediate parked position and the catch features of the present disclosure help prevent this from occurring.

Figure 5A:
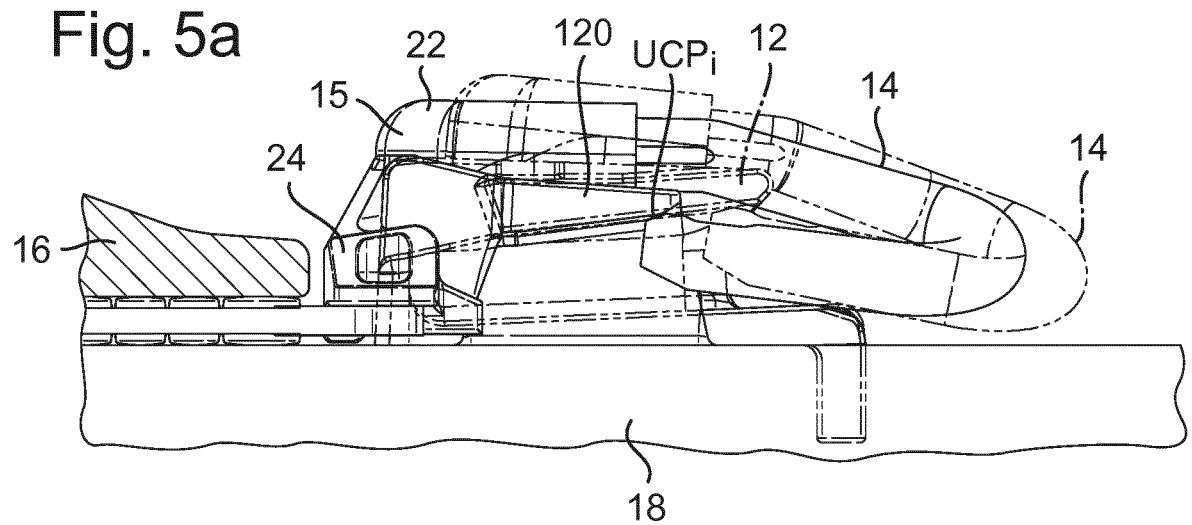
Figure 5B:
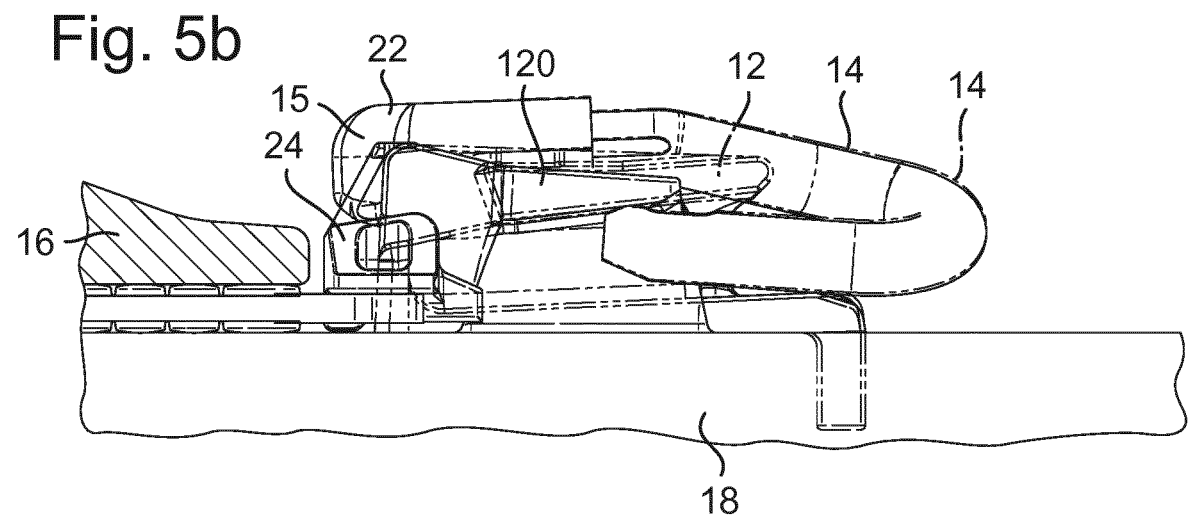
Figure 5C:
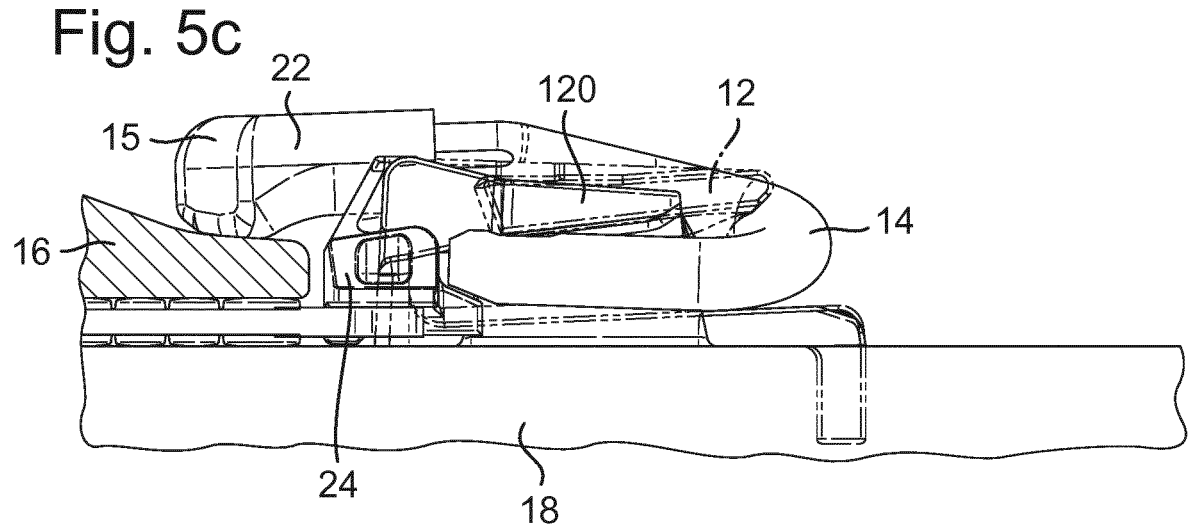

Referring now to FIG. 5, the progression of the clip 14 in the anchoring device 120 of the present disclosure (shown in solid lines) is compared to that for the previously-proposed anchoring device 12 (shown in dotted lines). As will be apparent, the position of the clip 14 relative to the anchoring devices 12, 120 differs most when in the initial wedged position (as depicted in FIG. 5a). By contrast, the position of the clip 14 in the engaged position for the anchoring device 120 according to the present disclosure (as depicted in FIG. 5c) is substantially identical to that for the previously-proposed anchoring device 12. This is intentional as the same clip 14 is used for compatibility so as to replicate the loads and performance of the previously-proposed anchoring device 12.

The configuration of the anchoring device 120 of the present disclosure results in the clip 14 moving in a substantially linear direction between the initial wedged position and the engaged position. By contrast, the clip 14 in the previously-proposed anchoring device 12 undergoes a degree of rotation as it moves from the initial wedged position to the parked position.

Referring again to FIG. 5a, the clip 14 is closer to the rail 16 in the initial wedged position for the anchoring device 120 according to the present disclosure than for the previously-proposed anchoring device (e.g. because the initial upper clip contact point UCPi has been moved closer to the rail 16). As a result, with the anchoring device 120 of the present disclosure, the clip toe portion 15 may overhang the side post insulator 24 when in the initial wedged position (whereas this may not be the case for the previously-proposed anchoring device 12). When a toe insulator 22 is provided, it may be that just the toe insulator 22 or both the toe insulator 22 and the clip toe portion 15 overhang the side post insulator 24 when in the initial wedged position.

Furthermore, with the anchoring device 120 of the first arrangement, a point on the clip 14 that contacts the lower clip contact walls 136a, 136b in the initial wedged position has moved further back from the distal end of the clip leg portion 14a than in the case of the previously-proposed anchoring device 12.

Figure 6:
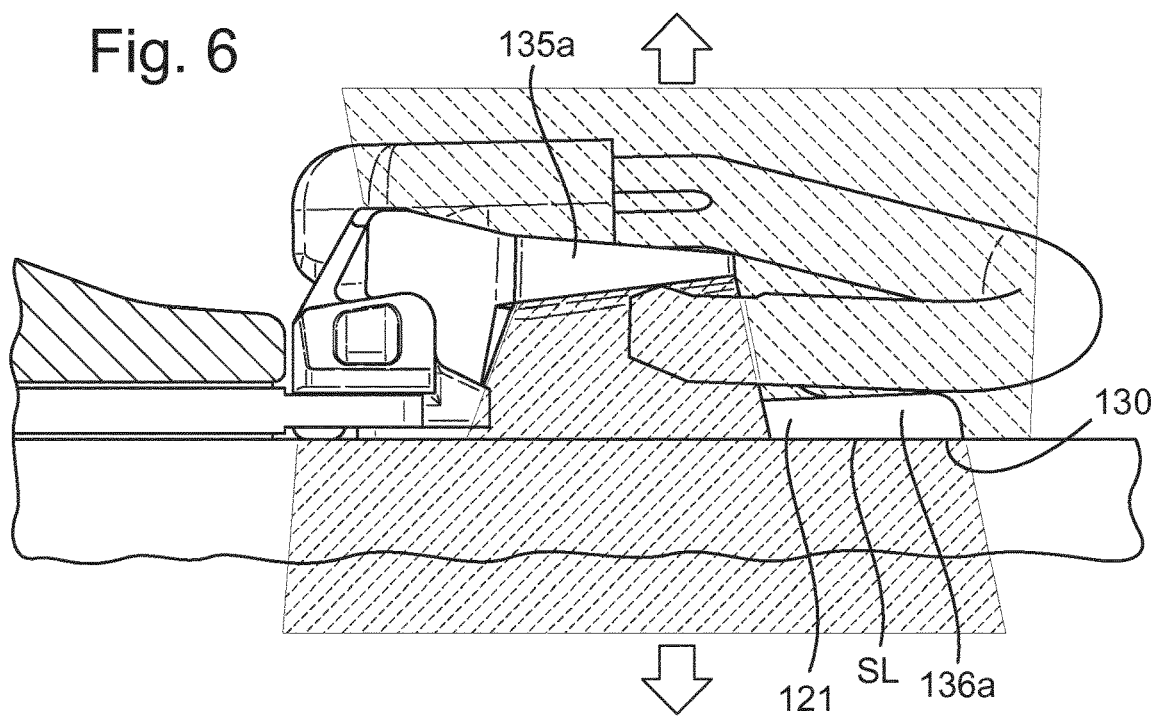
FIG. 6 is a side view of the anchoring device according to the first arrangement of the present disclosure and schematically depicts a split mould line.

With reference to FIG. 6, the anchoring device 120 may be moulded from top to bottom, e.g. with a split line SL that is substantially parallel to the bottom surface 130 of the base member 121. The split line SL may deviate from the base member 121 to follow the upper clip contact walls 135a, 135b. The presence of the opening 132 and protrusion 128 make it difficult to mould the anchoring device 120 with a vertical split line, however, having non-overhanging upper and lower clip contact walls 135a, 135b; 136a, 136b allows the anchoring device 120 to be moulded with a substantially horizontal split line SL, which also permits the opening 132 and protrusion 128 features to be moulded.

The anchoring device 120 advantageously tapers away in all directions from the split line SL, thereby permitting a pattern of the anchoring device 120 to be removed from the mould without the walls of the void caving in.

The inventors of the anchoring device 120 have realised that it is possible to space apart the initial upper clip contact point UCPi and the engaged lower clip contact point LCPe in the first direction and still be able to drive the clip 14 from the initial wedged position to the engaged position. Having spaced apart initial upper and engaged lower clip contact points UCPi, LCPe then allows the upper and lower clip contact walls to be spaced apart as well, which in turn permits the anchoring device 120 to be more readily moulded.

Figure 7:
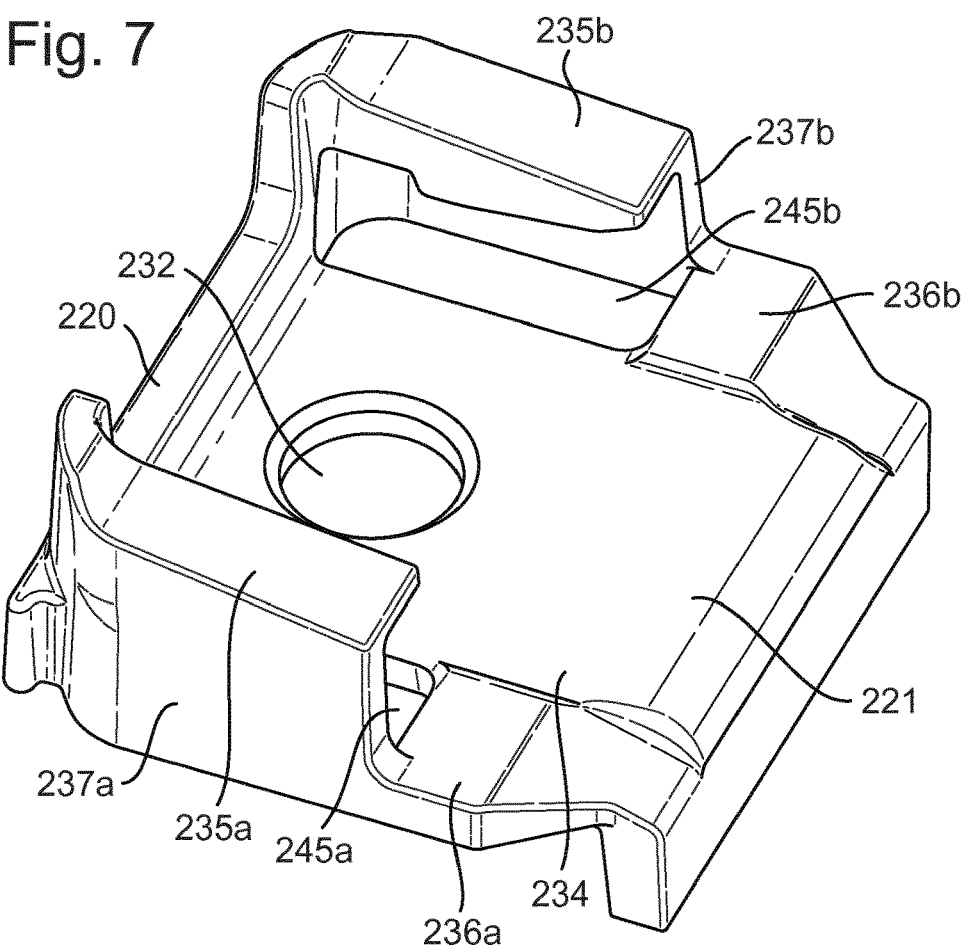
FIG. 7 is a perspective view of an anchoring device according to a second arrangement of the present disclosure.

With reference to FIG. 7, an anchoring device 220 according to a second arrangement of the present disclosure may comprise first and second side walls 237a, 237b that are provided laterally outboard of the respective clip leg portions 14a. The remaining features of the anchoring device 220 may be the same as those described above in respect of the anchoring device 120. For example, upper clip contact walls 235a, 235b are provided on the respective first and second side walls 237a, 237b, which extend from the top surface 234 of the base member 221 either side of the opening 232. The base member 221 may have first and second openings 245a, 245b provided beneath the upper clip contact walls 235a, 235b so that the upper clip contact walls 235a, 235b do not overhang the base member 221. Accordingly, as for the anchoring device 120, the anchoring device 220 may be more readily moulded thanks to offset upper and lower clip contact walls 235a, 235b; 236a, 236b.

Figure 8:
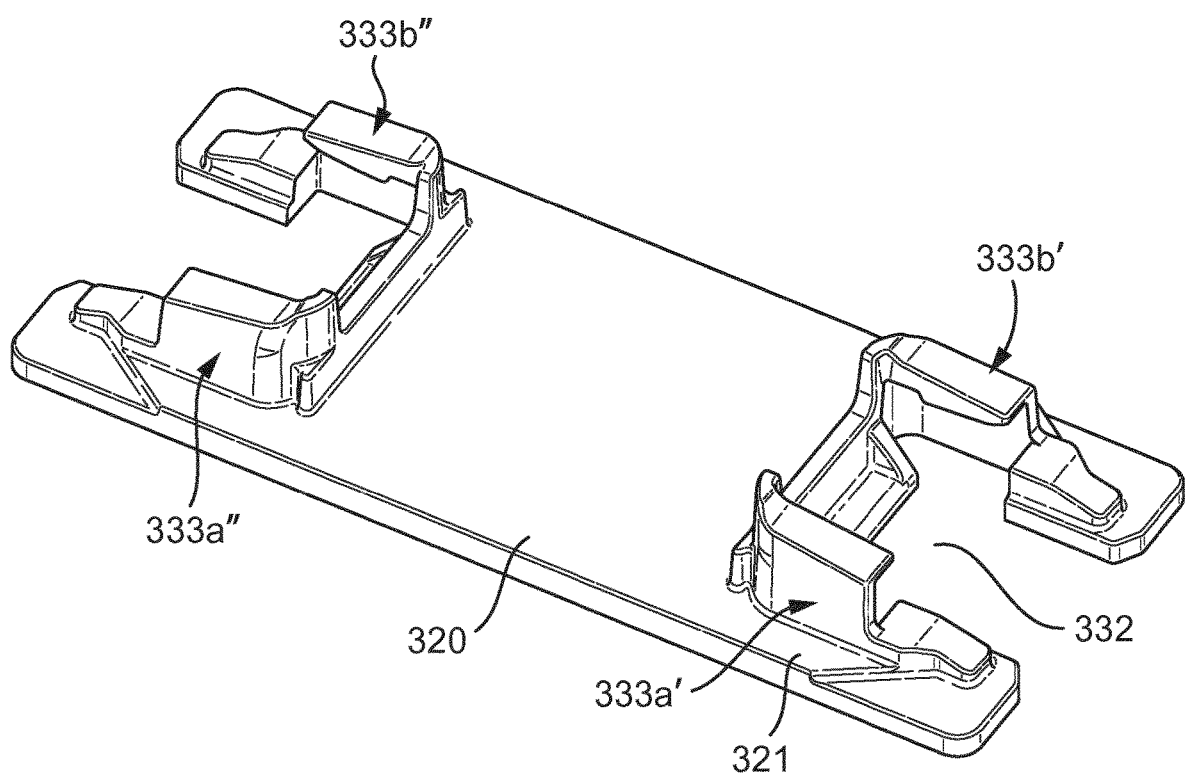
FIG. 8 is a perspective view of an anchoring device according to a third arrangement of the present disclosure.

The openings 132, 232 in the above-described base members 121, 221 may be enclosed, e.g. completely bounded. However, as depicted in FIG. 8, an anchoring device 320 according to a third arrangement of the present disclosure may comprise an opening 332 in base member 321 that is not enclosed or completely bounded. For example, rather than receiving a stud or bolt, the opening 332 may instead receive a clamp (not depicted). The clamp may be configured to clamp the anchoring device 320 to the underlying foundation 18.

Additionally or alternatively, the anchoring device 320 may comprise a first set of first and second clip retaining sides 333a', 333b' at a first end of the base member 321 and a second set of first and second clip retaining sides 333a", 333b" at a second end of the base member 321. The first set of first and second clip retaining sides 333a', 333b' may receive a first clip 14 for bearing on a first side of the rail 16. The second set of first and second clip retaining sides 333a", 333b" may receive a second clip 14 for bearing on a second side of the rail 16. Accordingly, the anchoring device 320 (in particular the base member 321) may extend beneath the rail 16 and a space for receiving the railway rail may be defined between the first set of first and second clip retaining sides 333a', 333b' and the second set of first and second clip retaining sides 333a", 333b". The anchoring device 320 may thus be in the form of a base plate. The remaining features of the anchoring device 320 may be the same as those described above in respect of the anchoring device 120 or anchoring device 220, in particular the anchoring device 320 may be more readily moulded thanks to offset upper and lower clip contact walls.

Figure 9:
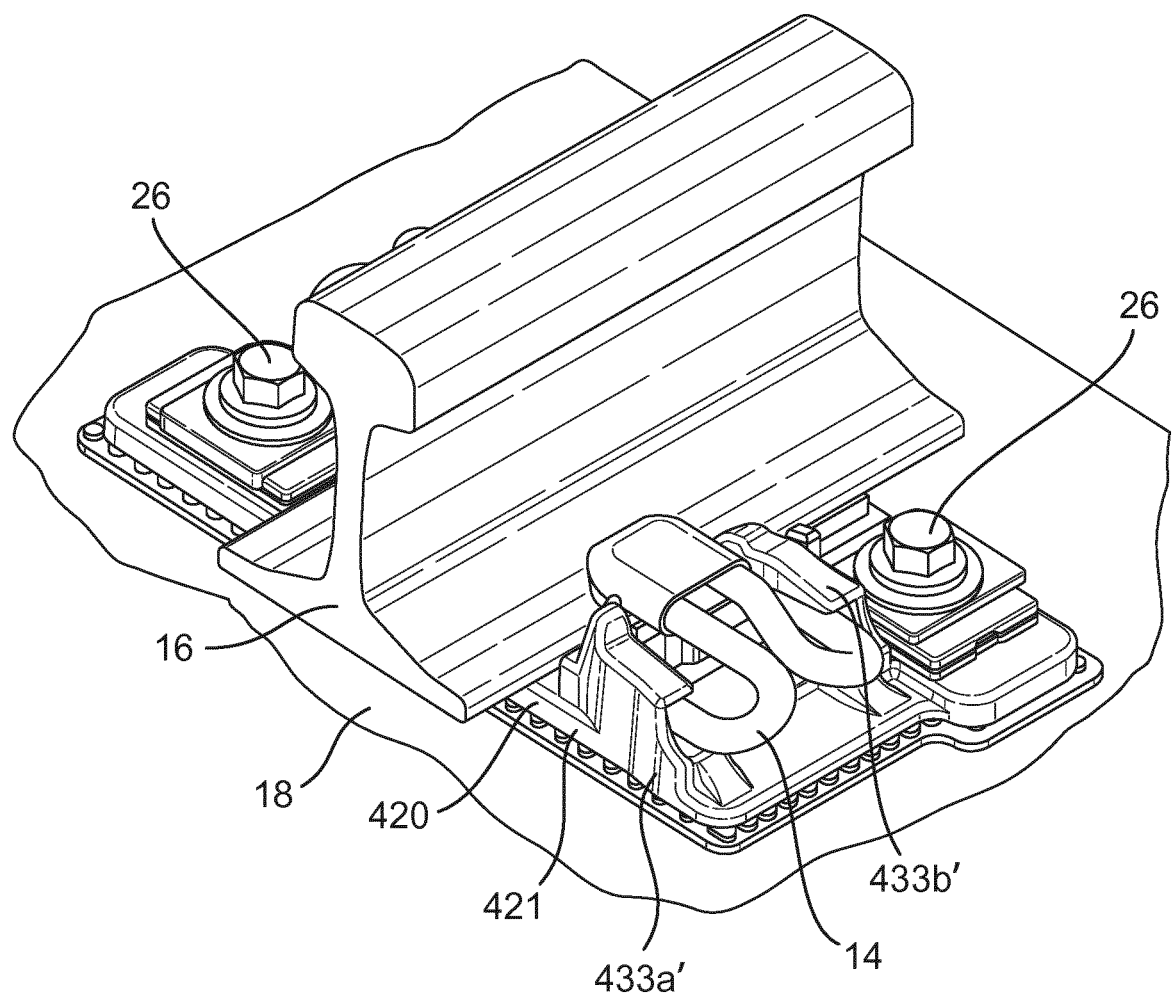
FIG. 9 is a perspective view of an anchoring device according to a fourth arrangement of the present disclosure when installed as part of a railway rail fastening assembly.
Figure 10:
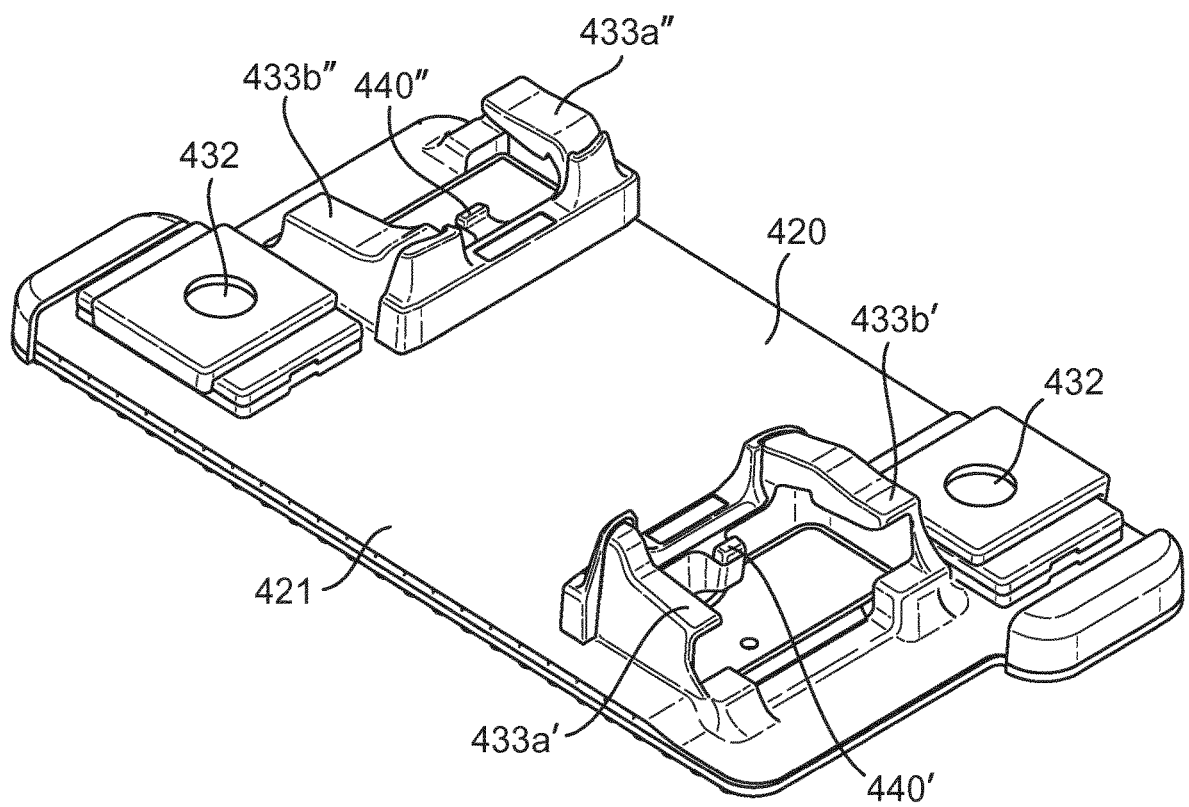
FIG. 10 is a perspective view of the anchoring device according to the fourth arrangement of the present disclosure.

FIGS. 9 and 10 depict an anchoring device 420, e.g. base plate, according to a fourth arrangement of the present disclosure. As for the anchoring device 320 of the third arrangement, the anchoring device 420 according to the fourth arrangement comprises a first set of first and second clip retaining sides 433a', 433b' at a first end of the base member 421 and a second set of first and second clip retaining sides 433a", 433b" at a second end of the base member 421. The first set of first and second clip retaining sides 433a', 433b' may receive a first clip 14 for bearing on a first side of the rail 16. The second set of first and second clip retaining sides 433a", 433b" may receive a second clip 14 for bearing on a second side of the rail 16. Accordingly, the anchoring device 420 (in particular the base member 421) may extend beneath the rail 16 and a space for receiving the railway rail may be defined between the first set of first and second clip retaining sides 433a', 433b' and the second set of first and second clip retaining sides 433a", 433b".

As for the other anchoring devices, the anchoring device 420 according to the fourth arrangement of the present disclosure comprises an opening 432 in the base member 421 for receiving the fastening means 26. However, in contrast to the other anchoring devices, the opening 432 may not be provided between the first and second clip retaining sides, but may instead be provided to one side of both the first and second clip retaining sides.

A pair of openings 432 may be provided with one opening either side of the rail. The openings 432 provided either side of the rail may be provided on opposite sides of the base member 421, e.g. so that the openings 432 do not face one another. Likewise, the first and second sets of the first and second clip retaining sides may be provided on opposite sides of the base member 421, e.g. so that the first and second sets of the first and second clip retaining sides do not face one another.

The openings 432 may be enclosed, e.g. completely bounded. The openings 432 may receive a fastening means 26 in the form of a stud or bolt. However, it is also envisaged that the openings 432 may not be enclosed or completely bounded. For example, rather than receiving a stud or bolt, the opening 432 may instead receive a clamp (not depicted). The clamp may be configured to clamp the anchoring device 420 to the underlying foundation 18.

In contrast to the arrangements described above, the anchoring device 420 may comprise a single catch feature 440' between the first set of first and second clip retaining sides 433a', 433b' and a single catch feature 440" between the second set of first and second clip retaining sides 433a", 433b". The catch features 440', 440" may be centrally disposed between the respective first and second clip retaining sides. However, it is also envisaged that a pair of catch features may be provided between the first and second clip retaining sides in a manner similar to that described above for the other arrangements. Furthermore, the catch features 440', 440" of the fourth arrangement may engage an abutment surface 22a associated with the clip 14 in the same manner as described above.

The remaining features of the anchoring device 420 may be the same as those described above in respect of the anchoring devices 120, 220 or 320, in particular the anchoring device 420 may be more readily moulded thanks to offset upper and lower clip contact walls.

What is claimed is:

1. An anchoring device for use in retaining a railway rail fastening clip having first and second leg portions and a rail-bearing portion therebetween, the anchoring device comprising:
   a base member;
   an opening in the base member configured to receive a fastening component for fastening the anchoring device to an underlying foundation; and
   first and second clip-retaining sides extending from said base member with the first clip-retaining side being spaced apart from the second clip-retaining side so as to define a space between the first and second clip-retaining sides for receiving the rail-bearing portion of the clip;
   wherein each of the first and second clip-retaining sides comprises upper and lower clip contact walls defining a passageway for receiving one of the first and second leg portions of the clip, wherein each of the first and second leg portions of the clip contact the upper and lower clip contact walls of the respective first and second clip-retaining sides as the clip moves in a first direction from an initial wedged position towards an engaged position in which the rail-bearing portion of the clip bears on the rail, and
   wherein the upper and lower clip contact walls are spaced apart in the first direction so as not to overlap one another.

2. The anchoring device of claim 1, wherein the first and second clip-retaining sides are configured such that an initial upper contact point on the upper clip contact wall, at which the clip first contacts the upper contact wall in the initial wedged position, is forward in the first direction of an engaged contact point on the lower clip contact wall, at which the clip contacts the lower clip contact wall in the engaged position.

3. The anchoring device of claim 1, wherein the lower clip contact walls each comprise a ramp defining an initial lower clip contact point on the lower clip contact wall, at which the clip first contacts the lower clip contact wall in the initial wedged position.

4. The anchoring device of claim 3, wherein the ramp comprises a substantially flat portion.

5. The anchoring device of claim 3, wherein each ramp is formed by a respective notch in an end of the lower clip contact wall.

6. The anchoring device of claim 5, wherein the notches are laterally spaced apart across a width of the anchoring device.

7. The anchoring device of claim 1, further comprising a downwards facing protrusion provided on a bottom surface of the base member, the anchoring device protrusion being configured to slidably engage with a corresponding recess associated with the underlying foundation so as to permit vertical adjustment of the anchoring device relative to the underlying foundation.

8. The anchoring device of claim 7, wherein the lower clip contact walls each comprise a ramp defining an initial lower clip contact point on the lower clip contact wall, at which the clip first contacts the lower clip contact wall in the initial wedged position, and wherein the ramps are provided above the downwards facing protrusion.

9. The anchoring device of claim 1, wherein an end of the lower clip contact wall that is closest to the upper clip contact wall has an end surface that is angled relative to a bottom surface of the base member with a non-perpendicular angle.

10. The anchoring device of claim 1, wherein an end of the upper clip contact wall that is closest to the lower clip contact wall has an end surface that is angled relative to a bottom surface of the base member with a non-perpendicular angle.

11. The anchoring device of claim 10, wherein an end of the lower clip contact wall that is closest to the upper clip contact wall has an end surface that is angled relative to a bottom surface of the base member with a non-perpendicular angle, and wherein the end surface of the lower clip contact wall and the end surface of the upper clip contact wall are substantially in line.

12. The anchoring device of claim 1, wherein the upper clip contact wall is tapered at an end closest to the lower clip contact wall such that the upper clip contact wall defines a first lower surface that is angled relative to a bottom surface of the base member with a first angle.

13. The anchoring device of claim 12, wherein the first angle of the first lower surface substantially corresponds to an angle of a chamfer at an end of the first and second leg portions of the clip when the clip is in the initial wedged position.

14. The anchoring device of claim 1, wherein a mid-region of the upper clip contact wall is tapered such that the upper clip contact wall defines a second lower surface that is angled relative to a bottom surface of the base member with a second angle.

15. The anchoring device of claim 1, wherein the anchoring device is configured such that the clip moves substantially linearly between the initial wedged position and the engaged position.

16. The anchoring device of claim 1, wherein the anchoring device comprises a first set of first and second clip retaining sides on a first end of the base member and a second set of first and second clip retaining sides on a second end of the base member, wherein a space for receiving the railway rail is defined between the first and second sets of the first and second clip retaining sides.

17. The anchoring device of claim 1, wherein the anchoring device further comprises at least one catch feature configured to hold the clip captive when the clip is in an intermediate parked position between the initial wedged position and the engaged position.

18. The anchoring device of claim 17, wherein the catch feature comprises an abutment surface that engages a corresponding abutment surface associated with the clip so as to resist movement of the clip away from the intermediate parked position.

19. A railway fastening assembly comprising the anchoring device of claim 1.

20. The railway fastening assembly of claim 19, wherein the assembly further comprises the clip and a side post insulator, wherein the clip overhangs the side post insulator when in the initial wedged position.

* * * * *